(12) United States Patent
Foesser et al.

(10) Patent No.: US 9,357,340 B2
(45) Date of Patent: May 31, 2016

(54) METHOD OF CONFIGURING TWO WIRELESS DEVICES

(71) Applicant: GEMALTO SA, Meudon (FR)

(72) Inventors: Christophe Foesser, La Ciotat (FR); Stephane Botuha, La Ciotat (FR); Stephane Blanc, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/423,716

(22) PCT Filed: Sep. 9, 2013

(86) PCT No.: PCT/EP2013/068572
§ 371 (c)(1),
(2) Date: Feb. 25, 2015

(87) PCT Pub. No.: WO2014/048703
PCT Pub. Date: Apr. 3, 2014

(65) Prior Publication Data
US 2015/0326999 A1     Nov. 12, 2015

(30) Foreign Application Priority Data
Sep. 25, 2012 (EP) .................................. 12306156

(51) Int. Cl.
*H04W 4/00* (2009.01)
*H04B 5/00* (2006.01)
(Continued)

(52) U.S. Cl.
CPC ........... *H04W 4/008* (2013.01); *G06K 7/10198* (2013.01); *G06K 7/10227* (2013.01);
(Continued)

(58) Field of Classification Search
CPC ............ H04L 41/0809; H04L 41/0886; H04L 67/1039; H04W 4/008; H04W 84/18; H04B 5/0062; H04B 13/02; H04B 1/71637; G06K 7/10227; G06K 19/0732
USPC ........................................................ 455/41.1
See application file for complete search history.

(56) References Cited

U.S. PATENT DOCUMENTS

| 7,128,274 B2 * | 10/2006 | Kelley ................ G06K 7/0008 235/492 |
| 7,130,622 B2 * | 10/2006 | Vanska .................... G06F 8/62 455/414.1 |

(Continued)

OTHER PUBLICATIONS

International Search Report (PCT/ISA/210) mailed on Oct. 15, 2013, by the European Patent Office as the International Searching Authority for International Application No. PCT/EP2013/068572.
(Continued)

*Primary Examiner* — Hai V Nguyen
(74) *Attorney, Agent, or Firm* — Buchanan Ingersoll & Rooney PC

(57) ABSTRACT

The invention is a method of configuring a device and a wireless unit. The device is able to operate in tag mode and in wireless reader mode. The wireless unit is able to operate in wireless reader mode and in a card emulation mode. The method comprises the steps of:
reading a setting data into the device running in tag mode, the setting data corresponding to a first configuration and being read by the wireless unit which operates in wireless reader mode,
activating the first configuration in the unit, writing an acknowledgment data into the device and switching the unit to the card emulation mode,
switching the device to the wireless reader mode when the presence of the acknowledgment data is detected in the device.

10 Claims, 4 Drawing Sheets

(51) Int. Cl.
*H04L 29/08* (2006.01)
*G06K 7/10* (2006.01)
*H04L 29/06* (2006.01)
*H04L 12/24* (2006.01)

(52) U.S. Cl.
CPC .......... *G06K7/10237* (2013.01); *H04B 5/0062* (2013.01); *H04L 41/0809* (2013.01); *H04L 41/0886* (2013.01); *H04L 67/1093* (2013.01); *H04L 69/24* (2013.01)

(56) References Cited

U.S. PATENT DOCUMENTS

| | | | | |
|---|---|---|---|---|
| 7,881,709 B2* | 2/2011 | Wakasa | H04M 1/7253 | 455/412.1 |
| 7,885,603 B2* | 2/2011 | Santavicca | B60C 23/0462 | 370/280 |
| 7,941,197 B2* | 5/2011 | Jain | G06K 19/07739 | 379/433.05 |
| 7,954,723 B2* | 6/2011 | Charrat | H04L 45/54 | 235/380 |
| 8,011,590 B2* | 9/2011 | Leibenguth | G06K 19/005 | 235/441 |
| 8,060,012 B2* | 11/2011 | Sklovsky | G06F 9/445 | 455/41.1 |
| 8,381,999 B2* | 2/2013 | Jain | G06K 19/07739 | 235/487 |
| 8,401,681 B2* | 3/2013 | Rosenblatt | G06F 17/30058 | 381/123 |
| 8,458,363 B2* | 6/2013 | Rosenblatt | G06F 17/30058 | 709/248 |
| 8,516,125 B2* | 8/2013 | Rosenblatt | G06F 17/30058 | 707/812 |
| 8,571,596 B2* | 10/2013 | Caruana | H04B 5/00 | 370/318 |
| 8,602,314 B2* | 12/2013 | Thill | G06K 19/07739 | 235/492 |
| 8,670,410 B2* | 3/2014 | Luo | H04L 1/1607 | 370/331 |
| 8,698,603 B2* | 4/2014 | Jett | H04L 12/189 | 235/375 |
| 8,744,348 B2* | 6/2014 | Fine | G06K 7/0008 | 455/41.1 |
| 8,840,030 B2* | 9/2014 | Kelley | G06K 7/0008 | 235/380 |
| 8,850,052 B2* | 9/2014 | Rosenblatt | H04L 12/2812 | 709/212 |
| 8,874,162 B2* | 10/2014 | Schrader | H04M 1/72577 | 340/670 |
| 8,914,061 B2* | 12/2014 | Charrat | G06K 19/0724 | 340/10.1 |
| 8,934,460 B1* | 1/2015 | Hu | H04W 76/026 | 370/252 |
| 9,037,513 B2* | 5/2015 | Rosenblatt | G06Q 10/02 | 235/379 |
| 9,064,164 B2* | 6/2015 | Jett | H04L 12/189 | |
| 9,122,903 B2* | 9/2015 | Mourtel | G06K 7/0008 | |
| 9,130,802 B2* | 9/2015 | Rosenblatt | G06F 17/30058 | |
| 9,142,999 B2* | 9/2015 | Von Novak | H02J 7/0004 | |
| 9,195,931 B2* | 11/2015 | Jain | G06K 7/10237 | |
| 9,197,719 B2* | 11/2015 | Bradley | H04W 12/06 | |
| 9,210,530 B2* | 12/2015 | Wei | H04W 4/001 | |
| 2005/0015533 A1* | 1/2005 | Naura | G11C 29/46 | 710/105 |
| 2006/0181395 A1* | 8/2006 | Gruszynski | G06K 7/10217 | 340/10.51 |
| 2006/0213972 A1* | 9/2006 | Kelley | G06K 7/0008 | 235/380 |
| 2008/0254780 A1* | 10/2008 | Kuhl | G06F 9/5055 | 455/418 |
| 2008/0299904 A1* | 12/2008 | Yi | H01Q 7/06 | 455/41.1 |
| 2009/0065571 A1* | 3/2009 | Jain | G06K 19/07739 | 235/379 |
| 2009/0070272 A1* | 3/2009 | Jain | G06K 19/07739 | 705/75 |
| 2009/0276439 A1* | 11/2009 | Rosenblatt | G06F 17/30058 | |
| 2009/0276547 A1* | 11/2009 | Rosenblatt | G06F 17/30058 | 710/33 |
| 2010/0014520 A1* | 1/2010 | Matsumoto | H04L 12/1868 | 370/390 |
| 2010/0082136 A1* | 4/2010 | Rosenblatt | G06F 17/30058 | 700/94 |
| 2010/0082784 A1* | 4/2010 | Rosenblatt | H04L 12/2812 | 709/222 |
| 2010/0099393 A1* | 4/2010 | Brisebois | H04M 15/28 | 455/418 |
| 2011/0215159 A1* | 9/2011 | Jain | G06K 19/07739 | 235/492 |
| 2011/0319134 A1* | 12/2011 | Leibenguth | G06K 19/005 | 455/558 |
| 2012/0034868 A1* | 2/2012 | Fine | G06K 7/0008 | 455/41.1 |
| 2012/0039227 A1* | 2/2012 | Chen | H04L 1/0015 | 370/311 |
| 2012/0129470 A1* | 5/2012 | Tandai | H04W 76/023 | 455/73 |
| 2012/0236771 A1* | 9/2012 | Luo | H04L 1/1607 | 370/311 |
| 2012/0258666 A1* | 10/2012 | Kasami | H04W 4/008 | 455/41.2 |
| 2012/0289161 A1* | 11/2012 | Caruana | H04W 52/288 | 455/41.2 |
| 2012/0322500 A1* | 12/2012 | Charrat | G06K 19/07767 | 455/552.1 |
| 2013/0016687 A1* | 1/2013 | Yang | H04L 1/1614 | 370/329 |
| 2013/0268437 A1* | 10/2013 | Desai | G06Q 30/0641 | 705/41 |
| 2013/0303143 A1* | 11/2013 | Schrader | H04M 1/72577 | 455/418 |
| 2013/0311602 A1* | 11/2013 | Rosenblatt | G06F 17/30058 | 709/217 |
| 2013/0332343 A1* | 12/2013 | Desai | G06Q 20/08 | 705/39 |
| 2013/0339232 A1* | 12/2013 | Desai | G06Q 20/08 | 705/41 |
| 2014/0015478 A1* | 1/2014 | Von Novak | H02J 7/0004 | 320/108 |
| 2014/0020068 A1* | 1/2014 | Desai | H04L 63/10 | 726/4 |
| 2014/0068027 A1* | 3/2014 | Flacco | H04L 12/2818 | 709/220 |
| 2014/0089113 A1* | 3/2014 | Desai | G06Q 20/322 | 705/16 |
| 2014/0089120 A1* | 3/2014 | Desai | G06Q 20/322 | 705/21 |
| 2014/0089185 A1* | 3/2014 | Desai | G06Q 20/322 | 705/41 |
| 2014/0095382 A1* | 4/2014 | Desai | G06Q 20/322 | 705/41 |
| 2014/0106733 A1* | 4/2014 | Wei | H04W 8/24 | 455/418 |
| 2014/0129430 A1* | 5/2014 | Desai | G06Q 20/08 | 705/39 |
| 2014/0129437 A1* | 5/2014 | Desai | G06Q 20/382 | 705/41 |
| 2014/0129438 A1* | 5/2014 | Desai | G06Q 20/105 | 705/41 |
| 2014/0130035 A1* | 5/2014 | Desai | G06F 8/65 | 717/172 |
| 2014/0146690 A1* | 5/2014 | Gupta | H04W 4/005 | 370/252 |
| 2014/0355623 A1* | 12/2014 | Waclawsky | H04L 69/163 | 370/465 |
| 2015/0011203 A1* | 1/2015 | Schrader | H04M 1/72577 | 455/418 |

(56) References Cited

U.S. PATENT DOCUMENTS

| | | | | |
|---|---|---|---|---|
| 2015/0026527 A1* | 1/2015 | Hou | ............................ | H04L 1/18 714/706 |
| 2015/0302398 A1* | 10/2015 | Desai | ......................... | G06F 8/60 705/41 |
| 2015/0310423 A1* | 10/2015 | Desai | ......................... | G06F 8/60 705/44 |
| 2015/0332254 A1* | 11/2015 | Desai | ......................... | G06F 8/60 705/41 |

OTHER PUBLICATIONS

Written Opinion (PCT/ISA/237) mailed on Oct. 15, 2013, by the European Patent Office as the International Searching Authority for International Application No. PCT/EP2013/068572.

* cited by examiner

METHOD OF CONFIGURING TWO WIRELESS DEVICES

FIELD OF THE INVENTION

The present invention relates to methods of configuring two wireless devices. It relates particularly to methods of configuring wireless devices able to operate according to several communication modes.

BACKGROUND OF THE INVENTION

The NFC (Near Field Communication) technology is based on the exchanging of data via a magnetic field. A NFC reader has an antenna which is able to modulate the magnetic field and to provide energy to NFC devices. The NFC reader is usually named a PCD (Proximity Coupling Device). A NFC device may be a PICC (Proximity Integrated Circuit Card or Proximity Card) or may embed components which act as logical PICC. A PICC and a PCD communicate thanks to an inductive coupling in a field frequency equal to 13.56 MHz. In particular, the ISO14443 and ISO18092 standards provide modulation technologies and communication protocols which may be used in NFC domain.

Several physical PICC may be present in the magnetic field of a PCD. That is why specific process allowing the PCD to enumerate the PICC have been defined. These processes are named anti-collision mechanisms.

Devices integrating wireless technologies (such as NFC) may operate according to one or several communication modes. Three operating modes (i.e. communication modes) are usually available: reader mode, card emulation mode and Peer-to-Peer (P2P) mode.

The reader mode (also named wireless reader mode) allows reading and writing other devices which are seen as a contactless card or as a contactless tag. Typically, a device operating in reader mode is able to read the content of the memory of an electronic tag or of a contactless card. Such readers may be used for payment or for controlling access to an area for example.

The card emulation mode allows the emulation of a contactless card or of a tag. The card emulation mode may be called tag mode when the device emulates a tag. An electronic tag is a passive device which is assumed to have a memory with very limited processing means unlike a contactless card which is assumed to have both a memory and computing means able to run security treatments. Basically card emulation mode and tag mode are equivalent in the sense that they must operate with a reader. In both cases there is a communication with a device operating in reader mode.

The Peer-to-Peer mode allows doing away with the master role of the reader and the slave role of the card by allowing balanced behavior between two wireless devices. In other words, the P2P mode allows the communication between two devices without the master/slave scheme.

A wireless device may embed a plurality of applications. When two wireless devices want to run a transaction, it is necessary to take measures to ensure that the applications active on both sides are mutually compatible. Such a configuration setting may be manually selected by a user. In this case, it is not convenient for the user and it takes time.

There is a need for automatically setting a configuration allowing a communication between two wireless devices.

SUMMARY OF THE INVENTION

An object of the invention is to solve the above mentioned technical problem.

The object of the present invention is a method for configuring a device and a wireless unit. The device is able to operate in tag mode and in a first communication mode included in the group comprising wireless reader mode and peer-to-peer mode. The wireless unit is able to operate in wireless reader mode and in a second communication mode included in the group comprising card emulation mode and peer-to-peer mode. The method comprises the following steps:

reading a setting data into the device which runs in tag mode, the setting data corresponding to a first configuration and being read by the wireless unit which operates in wireless reader mode, activating the first configuration in the wireless unit, writing an acknowledgment data into the device and switching the wireless unit to the second communication mode, switching the device to the first communication mode when the presence of the acknowledgment data is detected in the device.

Advantageously, the acknowledgment data may comprise an adjustment data which corresponds to a second configuration and the second configuration may be activated in the device according to the adjustment data.

Advantageously, the first configuration may specify specific communication protocol settings.

Advantageously, the first configuration may specify an application to be activated in the wireless unit.

Advantageously, the device may have a default mode which is the tag mode and this default mode may be activated when a preset event occurs.

Advantageously, the device may have a default mode which is the first communication mode, the tag mode may be activated if the device does not succeed in communicating with the wireless unit and the default mode may be activated when a predefined event occurs.

Another object of the invention is a device able to operate in tag mode and in a first communication mode included in the group comprising wireless reader mode and peer-to-peer mode. The device comprises a memory which may be read and written by a wireless unit when the device runs in tag mode. The memory comprises a setting data corresponding to a first configuration to be used by the wireless unit for communicating with the device running in the first communication mode. The device comprises a switching means adapted to detect the presence of an acknowledgment data written in the memory and to switch the device to the first communication mode when the presence of the acknowledgment data is detected.

Advantageously, the acknowledgment data may comprise an adjustment data corresponding to a second configuration. The device may comprise a setting means adapted to activate the second configuration in the device according to the adjustment data.

Advantageously, the device may have a default mode which is the tag mode and the device may comprise a restoring means adapted to activate the default mode when a preset event occurs.

Advantageously, the device may have a default mode which is the first communication mode. The switching means may be adapted to activate the tag mode if the device does not succeed in communicating with the wireless unit. The device may comprise a restoring means adapted to activate the default mode when a predefined event occurs.

Another object of the invention is a wireless unit able to run in wireless reader mode and in a second communication mode included in the group comprising card emulation mode and peer-to-peer mode. The wireless unit has a default mode which is the wireless reader mode. The wireless unit comprises a configuration means adapted to read a setting data into a device that runs in tag mode, the setting data corresponding to a first configuration. The configuration means is adapted to activate the first configuration in the wireless unit, to write an acknowledgment data into a memory of the device and to switch the wireless unit to the second communication mode.

Advantageously, the wireless unit may comprise a restoring means adapted to activate the default mode when a preset event occurs.

Another object of the invention is a system comprising a device according to the invention and a wireless unit according to the invention.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of wireless device able to operate in several communication modes. These devices may be portable devices like mobile phone or Electronic Funds Transfer Terminals for payment. These devices may be fixed devices like access control machine for transport network. It is assumed that only one communication mode can be active in a wireless device at a time.

An advantage of the invention is to allow the selection of a device configuration which may specify a targeted application, a targeted communication protocol or a combination of an application and a protocol or any targeted applicative data.

The terms "wireless unit" and "wireless device" are considered to have the same meaning in this specification.

Figure 1:
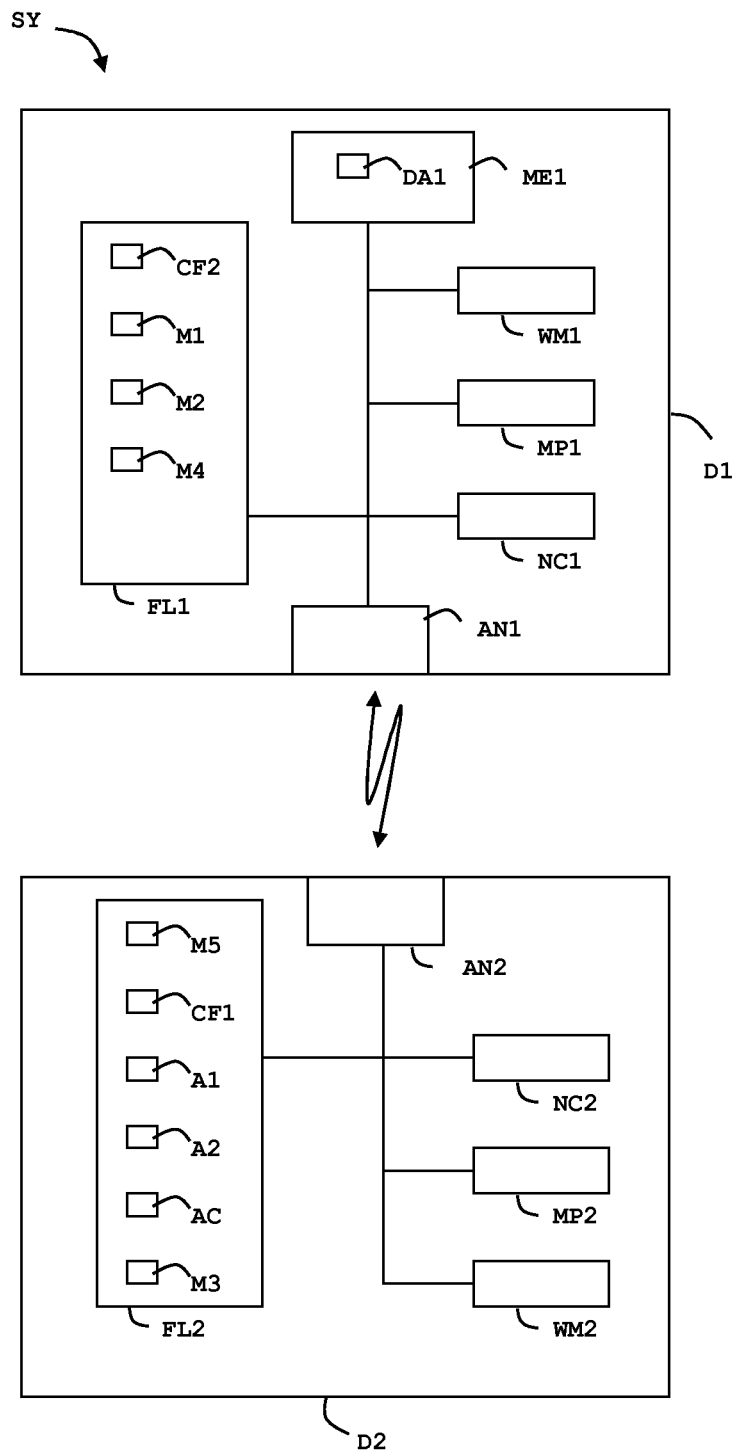
FIG. 1 depicts schematically an example of architecture of two wireless devices according to the invention.

FIG. 1 shows the architecture of a wireless device and a wireless unit belonging to a system according to the invention.

The system SY comprises a wireless device D1 and a wireless unit D2.

The wireless device D1 is a device controlling access to a public transport network, like a subway.

The wireless unit D2 is a wireless device of Mobile phone type which is assumed to host an application providing ticketing features corresponding to the public transport network. This application may be either directly embedded in the Mobile phone D2 or embedded in a UICC (Universal Integrated Circuit Card) which is comprised in the Mobile phone.

The device D1 is able to operate in Tag mode and in wireless reader mode. Alternatively, the device D1 is able to operate in Tag mode and in P2P mode. In another example, the device D1 is able to operate in Tag mode, in wireless reader mode and in P2P mode.

The device D1 comprises an antenna AN1, a NFC controller NC1, a working memory WM1, a microprocessor MP1 and two non volatile memories FL1 and ME1. The working memory WM1 may be a RAM (Random Access memory). The non volatile memories FL1 and ME1 can be implemented as two separate hardware components or merged in a single hardware component. The memory ME1 is the memory reachable by another wireless device when the device D1 runs in Tag mode. In other words the memory ME1 is seen as the Tag memory outside the device D1. The memory ME1 comprises a setting data DA1 which corresponds to a configuration CF1 to be used by another wireless device.

The memory FL1 comprises a configuration CF2 which may be activated into the device D1. For instance the configuration CF2 may identify a specific contactless protocol to be used or a specific application to be activated in the device D1. The memory FL1 comprises a switching means M1, a setting means M2 and a restoring means M4.

The switching means M1 is able to detect the presence of an acknowledgment data written in the memory ME1. The switching means M1 is able to switch the device D1 to the wireless reader mode when the presence of the acknowledgment data AC is detected in the memory ME1.

The setting means M2 is able to activate the configuration CF2 in the device D1 according to an adjustment data DA2 extracted from the acknowledgment data AC.

The restoring means M4 is able to activate the default mode of the device D1 when a preset event occurs. For instance, the preset event may be the fact that the device D1 remains idle during a preset duration. Alternatively, the preset event may be the Reset of the device D1.

The device D2 is able to operate in wireless reader mode and in card emulation mode. Alternatively, the device D2 is able to operate in wireless reader mode and in P2P mode. In another example, the device D2 is able to operate in card emulation mode, in wireless reader mode and in P2P mode.

The device D2 comprises an antenna AN2, a NFC controller NC2, a working memory WM2, a microprocessor MP2 and a non volatile memory FL2. The working memory WM2 is a RAM.

The memory FL2 comprises a configuration means M3, a restoring means M5, an acknowledgment data AC, a configuration CF1 and two applications A1 and A2.

The configuration CF1 may be activated into the device D2. For example, the configuration CF1 may identify the application A1. In other words, the activation of the configuration CF1 is carried out by activating the application A1 in the device D2.

The acknowledgment data AC may be a 1-byte pattern.

Advantageously, the device D2 may comprise a means adapted to dynamically generate the acknowledgment data AC in order to avoid the permanent storing of the acknowledgment data AC in the memory FL2.

The configuration means M3 is able to read a setting data DA1 from a wireless device which runs in tag mode. The configuration means M3 is able to identify the configuration CF1 which corresponds to the setting data DA1. The configuration means M3 is able to activate the configuration CF1 in the device D2. The configuration means M3 is able to write an acknowledgment data AC into the memory of a device running in tag mode. The configuration means M3 is able to trigger the switching of the wireless device D2 to the card emulation mode.

The restoring means M5 is able to set the default communication mode of the device D2 when a preset event occurs. For example, the preset event may be a reset of the device D2 or a predefined duration wherein the device D2 remains idle.

The application A1 may be a transport application corresponding to the subway while the application A2 may be a payment application allowing buying all kinds of goods.

The NFC controller NC2 fully manages the contactless protocols for the device D2. The contactless protocol may be compliant with ISO14443, ISO18092 or ISO15693 standards. The contactless protocol may also comply with proprietary specifications.

Figure 2:
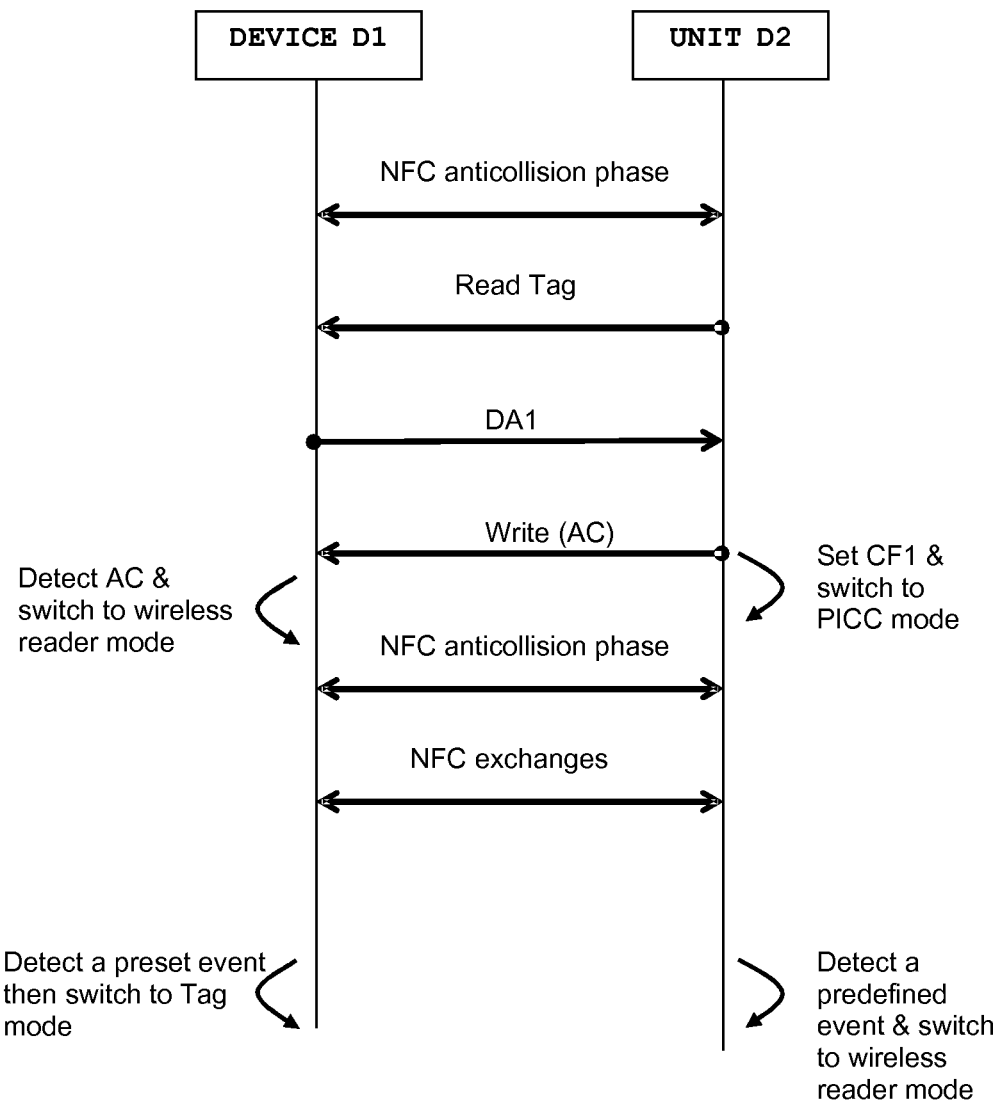
FIG. 2 is an example of a flowchart for configuring a wireless unit and a wireless device whose default mode is the tag mode according to the invention.

FIG. 2 shows an example of a flowchart for configuring a wireless unit D2 and a wireless device D1 whose default mode is the tag mode according to the invention. The device D1 and the unit D2 are assumed to have architectures similar to those described at FIG. 1.

In this example, the wireless device D1 is able to operate in tag mode and in reader mode while the wireless unit D2 is able to operate in card emulation mode and in reader mode. It must be understood that only one communication mode is active for a device at a time. The wireless unit D2 is assumed to run in wireless reader mode as default mode. The wireless device D1 is assumed to run in its default mode (i.e. in Tag mode). An anti-collision phase is assumed to have been successfully performed between the device D1 and the unit D2.

At a first step, the wireless unit D2 sends a read command targeting the device D1 as a tag. Preferably, the read command targets a specific address or a particular field in the memory ME1 of the device D1. Then the setting data DA1 is sent by the device D1 to the unit D2 in response to the read command (i.e. read Tag) at a second step. At a third step, the unit D2 analyzes the content of the received setting data DA1 and identifies the configuration CF1 which corresponds to this content. At a fourth step, the wireless unit D2 sends a write command targeting the device D1 as a tag. Advantageously, the write command targets a preset address or a preset field in the memory ME1 of the device D1. The write command aims at writing an acknowledgment data AC in the memory ME1 of the device D1. At a fifth step, the wireless unit D2 activates the configuration CF1 and switches the unit D2 to the card emulation mode. At a sixth step, the wireless device D1 detects the presence of the acknowledgment data AC in the memory ME1. For example, the device D1 may periodically check the content of a preset area of the memory ME1. The acknowledgment data AC is a signal allowing the device D1 to change its current communication mode at the right time. The device D1 may take into account the address which has been updated, the content of the acknowledgment data AC or the combination of the used address and the written value. If the acknowledgment data AC is recognized by the device D1, the device D1 switches to the wireless reader mode. From this point, the device D1 acts as a wireless reader while the unit D2 acts as a wireless card. A conventional anti-collision phase may be successfully performed between the device D1 and the unit D2. Then applicative data may be exchanged through the established wireless channel.

It should be noted that the writing of the acknowledgment data AC in the memory ME1 allows synchronizing the change of communication mode in both device D1 and unit D2.

Additionally, the device D1 may automatically switch to its default communication mode when a preset event occurs. For example, the device D1 switches to the Tag mode when no exchange may be carried out with any other wireless device during a predefined period.

Advantageously, the unit D2 may automatically switch to its default communication mode when a predefined event occurs. For example, the unit D2 switches to the wireless reader mode when a successful applicative transaction has been run with the device D1.

Advantageously, the wireless unit D2 may comprise a plurality of configurations. For instance, the wireless unit D2 may comprise two configurations: a first configuration which specifies an application and a second configuration which specifies an application with a communication protocol different of the default protocol.

The example of flowchart described at FIG. 2 is well suited for a device D1 which uses its own default configuration associated to the reader mode. For instance, this device D1 may be a part of a system for control of access to a transport vehicle. In such a case the application embedded in the device D1 for checking the access is specifically designed for the transport domain. In other words, the default configuration associated to the reader mode in the device D1 is an application of transport domain. In this example, the value of the setting data DA1 may allow the unit D2 to select the relevant corresponding transport application among the plurality of applications embedded in the unit D2. This automatic selection is particularly useful when several transport applications (corresponding to different companies or not) are present in the unit D2. Thanks to the invention, the device D1 activates a first transport application and the unit D2 automatically activates a second transport application which is compliant with the first transport application so that a transaction may be run between the two transport applications. Depending of the design of application, the device D1 may also activates a first part of a transport application, the unit D2 may automatically activate a second part of the transport application so that a transaction may be run between the two parts of the transport application.

Figure 3:
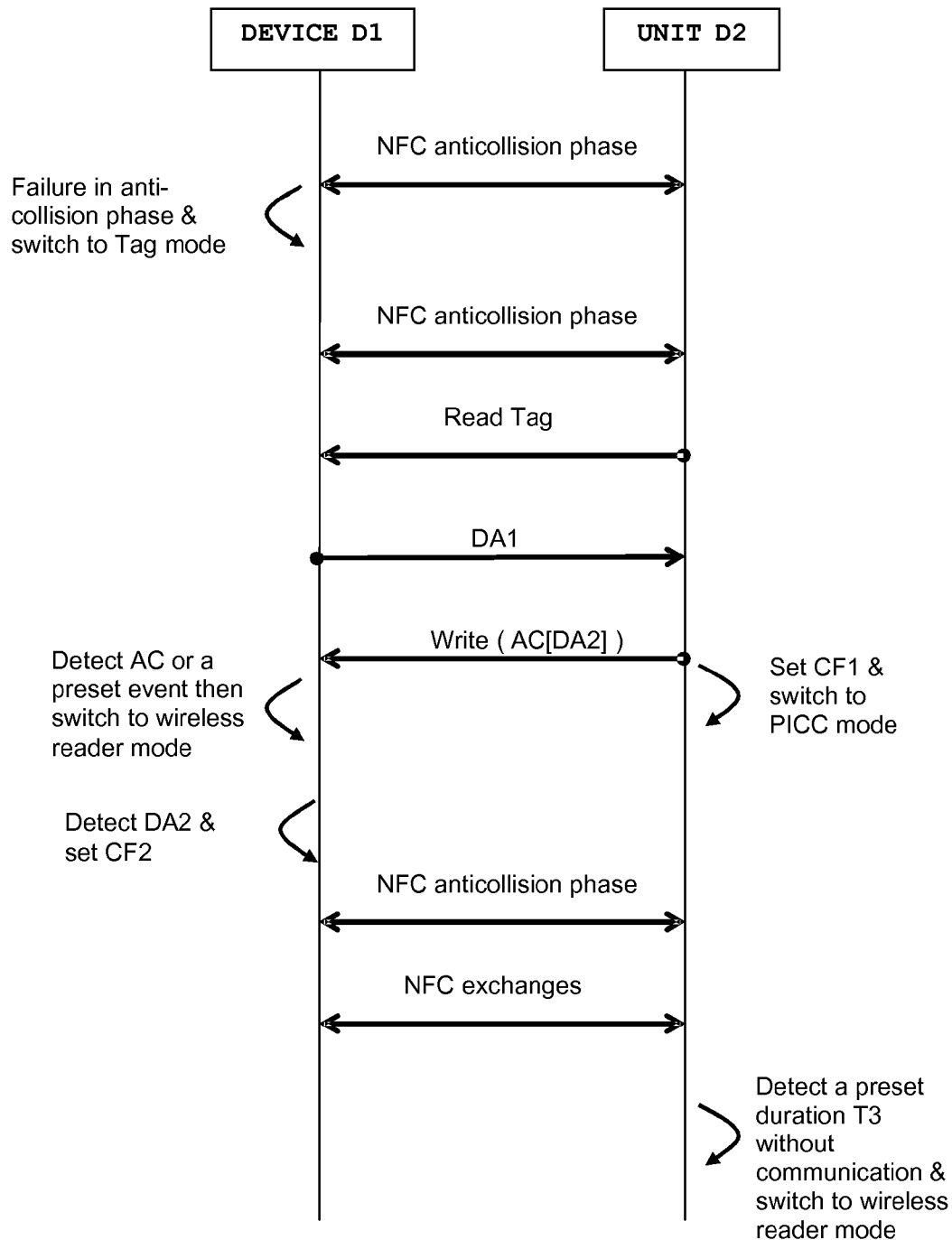
FIG. 3 is a first example of a flowchart for configuring a wireless unit and a wireless device whose default mode is the reader mode according to the invention.

FIG. 3 shows a first example of a flowchart for configuring a wireless unit D2 and a wireless device D1 whose default mode is the reader mode according to the invention. The device D1 and the unit D2 are assumed to have architectures similar to those described at FIG. 1.

In this example, the wireless device D1 is able to operate in tag mode and in reader mode while the wireless unit D2 is able to operate in card emulation mode and in reader mode. The wireless unit D2 is assumed to run in wireless reader mode as default mode. The wireless device D1 is assumed to run in wireless reader mode.

At a first step, the device D1 and the unit D2 try to perform an anti-collision phase. Since two wireless readers cannot establish a wireless connection the anti-collision phase is unsuccessful. The device D1 detects the failure of the anti-collision phase and automatically switches itself in Tag mode.

At a second step, an anti-collision phase is successfully performed between the device D1 and the unit D2 and the wireless unit D2 sends a read command targeting the device D1 as a tag. Then the setting data DA1 is sent by the device D1 to the unit D2 in response to the read command at a third step. At a fourth step, the unit D2 analyzes the content of the received setting data DA1 and identifies the configuration CF1 which corresponds to the content of the setting data DA1. At a fifth step, the wireless unit D2 sends a write command targeting the device D1 as a tag. The write command aims at writing an acknowledgment data AC in the memory ME1 of the device D1. In this example, the acknowledgment data AC comprises an adjustment data DA2 which corresponds to a configuration CF2. At a sixth step, the wireless unit D2 activates the configuration CF1 and switches itself to the card emulation mode. At a seventh step, the wireless device D1 detects the presence of the acknowledgment data AC in the memory ME1. For example, the device D1 may have a means which is automatically triggered when a data is written in the memory ME1. When the acknowledgment data AC is recognized by the device D1, the device D1 switches to the wireless reader mode. In addition, the device D1 detects the adjustment data DA2 and identifies the corresponding configuration CF2 to be used. Then the device D1 activates the configuration CF2. From this point, the device D1 acts as a wireless reader while the unit D2 acts as a wireless card and both devices are assumed to have relevant active configurations. Thus a conventional anti-collision phase may be successfully performed between the device D1 and the unit D2. Then applicative data may be exchanged through the established wireless channel.

Additionally, the unit D2 may automatically switch to its default communication mode when a preset event occurs. For example, the unit D2 may return to the wireless reader mode after a preset period has elapsed without exchanging data with another device.

The example of flowchart described at FIG. 3 is well suited for selecting a particular contactless protocol to be used between the device D1 and the unit D2. This example is also well suited when a specific application must be selected and activated in the device D1 in order to be able to manage applicative data sent to and received from the unit D2. For instance, this device D1 may be a part of a system able to manage different kinds of payment. In such a case, the application which is activated may correspond to a targeted bank while other applications corresponding to distinct banks are available for the device D1. Thanks to the adjustment data DA2 provided by the unit D2, the application associated to the targeted bank may be dynamically and automatically activated in the device D1. This automatic selection is particularly useful when a plurality of applications or communication protocols is available for the device D1.

Figure 4:
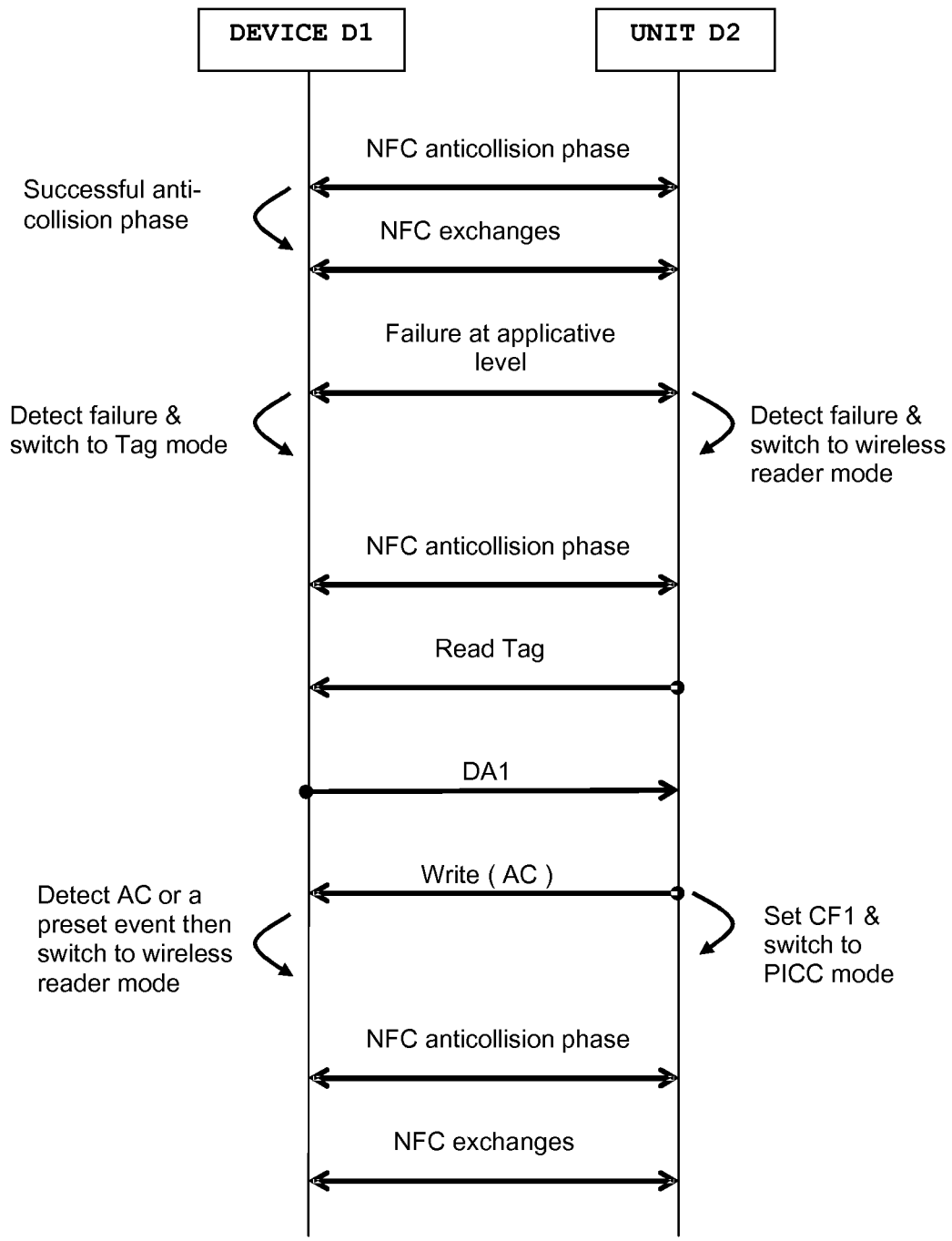
FIG. 4 is a second example of a flowchart for configuring a wireless unit and a wireless device whose default mode is the reader mode according to the invention.

FIG. 4 shows a second example of a flowchart for configuring a wireless unit D2 and a wireless device D1 whose default mode is the reader mode according to the invention. The device D1 and the unit D2 are assumed to have architectures similar to those described at FIG. 1.

In this example, the wireless device D1 is able to operate in tag mode and reader mode while the wireless unit D2 is able to operate in card emulation mode and reader mode. The wireless unit D2 is assumed to run in card emulation mode as default mode. The wireless device D1 is assumed to run in its default mode (i.e. reader mode).

At a first step, the device D1 and the unit D2 perform a successful anti-collision phase. At a second step, the device D1 and the unit D2 performs applicative exchanges. At a third step, the device D1 and the unit D2 detect a failure during applicative exchanges. For example, the application active in the unit D2 may be inconsistent with the behavior of the device D1. For instance, the application activated in the unit D2 may be a payment application while the application activated in the device D1 is an access control application.

At a fourth step, the wireless unit D2 automatically switches to the wireless reader mode in response to the failure detection. For the same reason, the device D1 switches to the Tag mode.

At a fifth step, an anti-collision phase is successfully performed between the device D1 and the unit D2 then the wireless unit D2 sends a read command targeting the device D1 as a tag. Then the setting data DA1 is sent by the device D1 to the unit D2 in response to the read command at a seventh step. At an eighth step, the unit D2 analyzes the content of the received setting data DA1 and identifies the configuration CF1 which corresponds to the content of the setting data DA1. At a ninth step, the wireless unit D2 sends a write command targeting the device D1 as a tag in order to write an acknowledgment data AC in the memory ME1 of the device D1. At a tenth step, the wireless unit D2 activates the configuration CF1 and switches itself to the card emulation mode. At an eleventh step, the wireless device D1 detects the presence of the acknowledgment data AC in the memory ME1 and switches to the wireless reader mode. From this point, the device D1 acts as a wireless reader while the unit D2 acts as a wireless card and both devices are assumed to have compliant active configurations. Thus a new conventional anti-collision phase may be successfully performed between the device D1 and the unit D2. Then applicative data may be successfully exchanged through the established wireless channel.

The example of flowchart described at FIG. 4 is well suited for selecting a particular application in the unit D2 when the current (or default) application of the unit D2 is not the good one.

The method describes at FIGS. 2-4 focus on two wireless devices aiming at communicating according to the reader/card scheme. The invention also applies to two wireless devices aiming at communicating according to the Peer-to-Peer scheme. The invention also applies to wireless devices able to operate in more than two communication modes.

It must be understood, within the scope of the invention, that the above-described embodiments are provided as non-limitative examples.

The configuration CF1 may identify an application to be activated, an applicative parameter value which must be used, a communication protocol to be used, a parameter of communication protocol to be used, or security features to be used for securing the communication. Such a security feature may be an algorithm or a secret data for example.

The configuration CF1 may identify a communication mode to be set in the device D2. Advantageously, the configuration CF2 may identify a communication mode to be set in the device D1.

The configuration CF1 may also identify a duration which is interpreted as a validity period to be taken into account by the unit D2.

Advantageously, the selection of the configuration CF1 may be based on a combination of the read setting data DA1 and a policy comprised in the unit D2. For example, the setting data DA1 may identify the domain of the application (i.e. transport, access control, gaming, data sharing, electronic identity or payment) and the policy specifies priority rules between several applications of a same domain.

The invention is not limited to NFC communication and applies to any kinds of contactless communication.

The invention claimed is:

1. A method for configuring a device and a wireless unit, said device being able to operate in tag mode and in a first communication mode included in the group comprising wireless reader mode and peer-to-peer mode, said wireless unit being able to operate in wireless reader mode and in a second communication mode included in the group comprising card emulation mode and peer-to-peer mode, wherein the method comprises the following steps:
reading a setting data from said device which runs in tag mode, said setting data corresponding to a first configuration and being read by said wireless unit which operates in wireless reader mode, activating said first configuration in said wireless unit, writing an acknowledgment data into said device and switching said wireless unit to said second communication mode, switching said device to said first communication mode when the presence of the acknowledgment data is detected in said device, said device and wireless unit being set to operate either with a combination of wireless reader and card emulation modes or both in peer-to-peer mode.

2. The method according to claim 1, wherein the acknowledgment data comprises an adjustment data corresponding to a second configuration and wherein said second configuration is activated in said device according to the adjustment data.

3. The method according to claim 1, wherein said first configuration specifies specific communication protocol settings.

4. The method according to claim 1, wherein said first configuration specifies an application to be activated in the wireless unit.

5. The method according to claim 1, wherein said device has a default mode which is the tag mode and wherein the default mode is activated when a preset event occurs.

6. The method according to claim 1, wherein said device has a default mode which is said first communication mode and wherein the tag mode is activated if said device does not succeed in communicating with said wireless unit and wherein the default mode is activated when a predefined event occurs.

7. A device able to operate in tag mode and in a first communication mode included in the group comprising wireless reader mode and peer-to-peer mode, said device comprising a memory which may be read and written by a wireless unit when running in tag mode, wherein the memory comprises a setting data corresponding to a first configuration to be used by the wireless unit for communicating with the device running in said first communication mode and in that wherein said device comprises a switching means adapted to detect the presence of an acknowledgment data written in the memory and to switch said device to said first communication mode when the presence of the acknowledgment data is detected.

8. The device according to claim 7, wherein the acknowledgment data comprises an adjustment data corresponding to a second configuration and wherein the device comprises a setting means adapted to activate the second configuration in said device according to the adjustment data.

9. A wireless unit able to run in wireless reader mode and in a second communication mode included in the group comprising card emulation mode and peer-to-peer mode, said wireless unit having a default mode, wherein the default mode is the wireless reader mode and wherein the wireless unit comprises a configuration means adapted to read a setting data from a device running in tag mode, said setting data corresponding to a first configuration, to activate said first configuration in the wireless unit, to write an acknowledgment data into a memory of said device and to switch said wireless unit to said second communication mode.

10. A system comprising a device and a wireless unit, wherein the wireless unit is the wireless unit of claim 9, and wherein the device comprises a memory which may be read and written by the wireless unit when running in tag mode, wherein the memory comprises setting data corresponding to a first configuration to be used by the wireless unit for communicating with the device running in a first communication mode included in the group comprising wireless reader mode and peer-to-peer mode, and wherein said device comprises a switching means adapted to detect the presence of acknowledgment data written in the memory, and to switch said device to said first communication mode when the presence of the acknowledgment data is detected.

* * * * *